(12) United States Patent
Shao et al.

(10) Patent No.: US 10,827,213 B2
(45) Date of Patent: Nov. 3, 2020

(54) METHOD AND APPARATUS FOR SYNCHRONOUSLY PLAYING MEDIA AND VIBRATION

(71) Applicant: AAC Technologies Pte. Ltd., Singapore (SG)

(72) Inventors: Xiaojie Shao, Shenzhen (CN); Xiuyue Wang, Shenzhen (CN); Jianqi Li, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 16/233,481

(22) Filed: Dec. 27, 2018

(65) Prior Publication Data

US 2019/0222886 A1 Jul. 18, 2019

(30) Foreign Application Priority Data

Jan. 12, 2018 (CN) .......................... 2018 1 0032538

(51) Int. Cl.
*H04N 21/43* (2011.01)
*H04N 21/8545* (2011.01)
*H04N 21/845* (2011.01)

(52) U.S. Cl.
CPC ..... *H04N 21/4307* (2013.01); *H04N 21/8456* (2013.01); *H04N 21/8545* (2013.01)

(58) Field of Classification Search
CPC .................. H04N 21/4307; H04N 21/8456
See application file for complete search history.

(56) References Cited

U.S. PATENT DOCUMENTS

| 5,594,660 A | * | 1/1997 | Sung ..................... G09G 5/393 |
| | | | 715/203 |
| 2009/0096632 A1 | * | 4/2009 | Ullrich .................... G09G 5/18 |
| | | | 340/4.21 |
| 2016/0320842 A1 | * | 11/2016 | Saboune ................ G06F 3/041 |

FOREIGN PATENT DOCUMENTS

CN 106095069 A1 11/2016

OTHER PUBLICATIONS

1st Office Action dated Jan. 9, 2020 by SIPO in related Chinese Patent Application No. 201810032538.9 (8 Pages).

* cited by examiner

*Primary Examiner* — Girumsew Wendmagegn
(74) *Attorney, Agent, or Firm* — IPro, PLLC; Na Xu

(57) ABSTRACT

The present disclosure relate to the technical field of electronic equipment and disclose a method and apparatus for synchronously playing media and a vibration. The method includes: S101: acquiring a time difference between a present media playing time point and a next vibration playing time point; S102: starting timing at the same time of playing the media from the present media playing time point; S103: comparing an actual present media playing time point with the vibration playing time point to obtain an error therebetween when timing duration is equal to the time difference; and S104: playing a vibration and returning to S101 if the error is less than a preset threshold, and skipping playing the vibration and returning to S101 if the error is greater than the preset threshold. Compared with the prior art, a good playing effect is achieved and the user experience may be effectively improved.

10 Claims, 4 Drawing Sheets

METHOD AND APPARATUS FOR SYNCHRONOUSLY PLAYING MEDIA AND VIBRATION

CROSS-REFERENCE TO RELATED APPLICATIONS

This application claims the priority benefit of Chinese Patent Application Ser. No. 201810032538.9 filed on Jan. 12, 2018, the entire content of which is incorporated herein by reference.

TECHNICAL FIELD

Embodiments of the present disclosure relate to the technical field of electronic equipment, and particularly relate to a method and apparatus for synchronously playing media and a vibration.

BACKGROUND

Along with the increasing progress of sciences and technologies, people have made increasing requirements on various electronic equipment and functions of various electronic equipment have also been increasingly perfected. Mobile phone is common electronic equipment in daily life. Nowadays, a user may use multiple functions like a media playing function in a mobile phone and may specifically watch movies and videos, listen to the music, play games and the like. Playing of many media may involve combination with vibration playing in, for example, explosion scenes and shooting scenes in movies and videos and shooting links in games. In the era of increasingly pursuing stereoscopic playing effects, good combination between media playing and vibration playing appears to be particularly important.

However, the inventor of the present disclosure finds that there usually exists the condition in an electronic product such as a mobile phone that video playing and vibration playing cannot be synchronized and this seriously affects a playing effect and reduces a user experience.

BRIEF DESCRIPTION OF THE DRAWINGS

One or more embodiments are exemplarily described through figures in the corresponding accompanying drawings. These exemplary descriptions are not intended to limit the embodiments. Elements with the same reference drawing numbers in the accompanying drawings represent similar elements. Unless particularly stated, the figures in the accompanying drawings are not intended to form proportional limits.

DETAILED DESCRIPTION

In order to make the objectives, technical solutions and advantages of the embodiments of the present disclosure clearer, each embodiment of the present disclosure will be described below in combination with the accompanying drawings in detail. However, those of ordinary skill in the art may understand that many technical details are presented in each embodiment of the present disclosure to make readers to understand the present disclosure better. However, the technical solutions claimed in the present disclosure may also be implemented even without these technical details and various variations and modifications made on the basis of each of the following embodiments.

A first embodiment of the present disclosure relates to a method for synchronously playing media and a vibration. The core of the embodiment lies in that: S101: acquiring a time difference between a present media playing time point and a next vibration playing time point; S102: starting timing at the same time of playing the media from the present media playing time point; S103: comparing an actual present media playing time point with the vibration playing time point to obtain an error therebetween when timing duration is equal to the time difference; and S104, playing a vibration and returning to S101 if the error is less than a preset threshold, and skipping playing the vibration and returning to S101 if the error is greater than the preset threshold.

In the embodiment, the time difference between the media playing time point and the next vibration playing time point is determined as the timing duration, the actual present media playing time point is compared with the vibration playing time point to obtain the error therebetween when timing is ended and the vibration is about to be played, the vibration is allowed only when the error is within a preset threshold range, otherwise the vibration is forbidden. In such a manner, occurrence of the vibration is allowed only when the vibration time point and the media playing time point are close enough. That is, it is ensured that a time difference between vibration and media playing is controlled within the preset threshold range to make asynchrony between vibration and media playing imperceptible for a user. Therefore, the problem that the media and the vibration cannot be synchronously played is effectively improved, a good playing effect is achieved and the user experience is effectively improved.

Implementation details about the method for synchronously playing the media and the vibration in the embodiment will be specifically described below. The following contents are only the implementation details provided to facilitate understanding and are optional to implementation of the solution.

Figure 1:
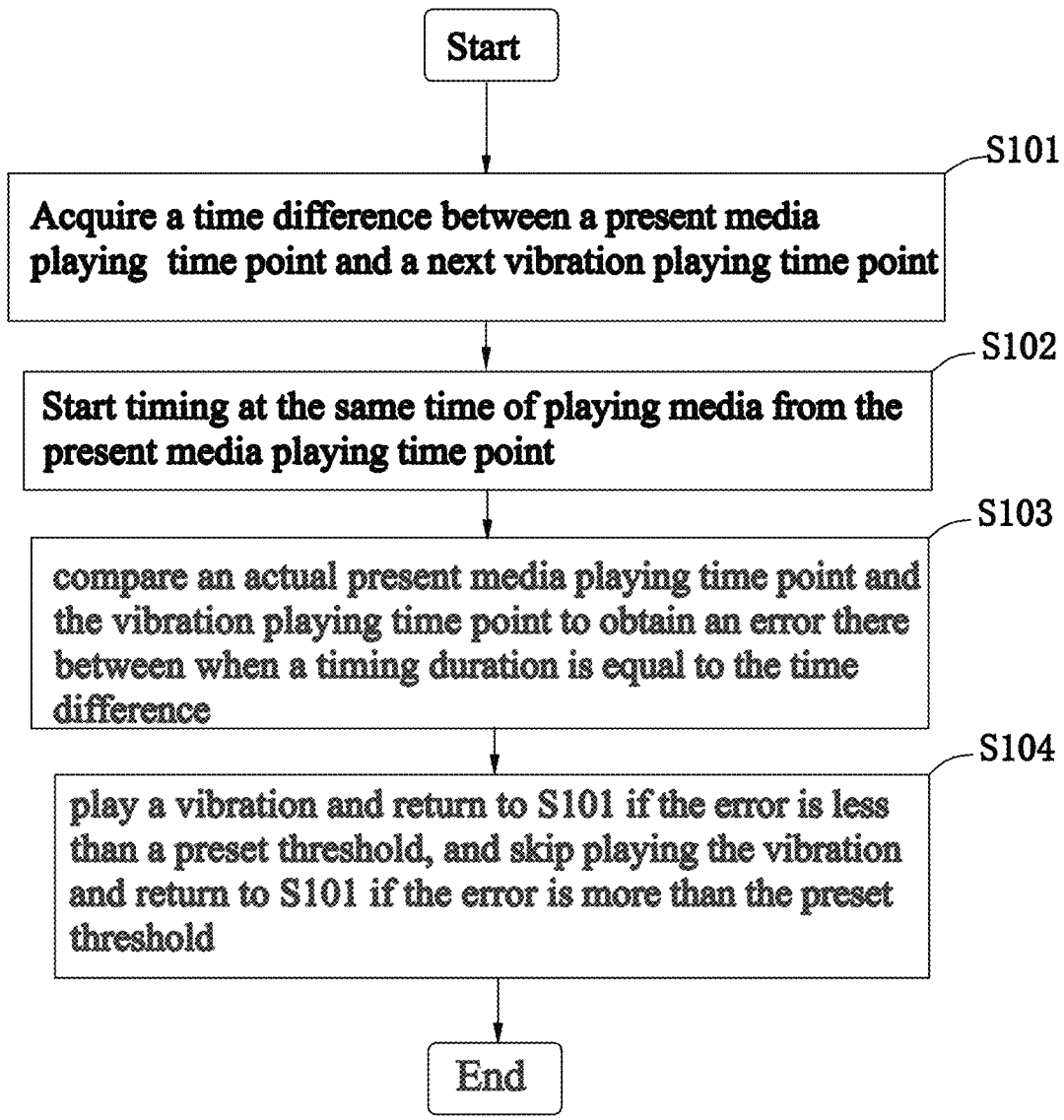
FIG. 1 is a flowchart of a method for synchronously playing media and a vibration according to a first embodiment of the present disclosure.

As shown in FIG. 1, the method for synchronously playing the media and the vibration in the embodiment specifically includes the following steps.

Step S101: A time difference between a present media playing time point and a next vibration playing time point is acquired.

Herein, media playing may include audio playing, video playing and the like and, of course, is not limited to the two listed kinds of playing. On a playing timeline, the so-called next vibration playing time point is a next vibration playing time point closest to the present media playing time point. It is to be noted that, when media playing is audio playing, audio playing is specifically implemented through an audio track progress and, when media playing is video playing, video playing is implemented through a frame number progress. However, an essence of either audio playing or video playing is playing according to a time progress.

Specifically, in the embodiment, the present media playing time point is set to $T_{c1}$, the next vibration playing time point corresponding to the present media playing time point $T_{c1}$ is set to $T_{v1}$, and after the two time points are acquired, the time difference $T_1$ is calculated, where $T_1=T_{v1}-T_{c1}$. That is, a difference value between the present media playing time point $T_{c1}$ and the next vibration playing time point $T_{v1}$ is determined as the time difference $T_1$.

Step S102: Timing starts at the same time of playing the media from the present media playing time point.

That is, after the time difference $T_1$ between the present media playing time point $T_{c1}$ and the next vibration playing time point $T_{v1}$ is acquired in step S101, the time difference $T_1$ is determined as timing duration. In the embodiment, timing is started for the timing duration at the same time of playing the media from the present media playing time point $T_{c1}$.

It is to be noted that, in the embodiment, timing for the timing duration may be implemented through a timer (of course, timing may also be implemented in another manner and, moreover, may be count-up and may also be count-down). Specifically, there is made such a hypothesis that the present media playing time point is $T_{c1}=1$, the next vibration playing time point is $T_{v1}=4$, the time difference $T_1=3$ is calculated, the time difference 3 is determined as the timing duration and obtained by the timer, and when playing is started from the present media playing time point $T_{c1}=1$, the timer is started and starts timing for the timing duration 3.

Step S103: When timing duration is equal to the time difference, an actual present media playing time point is compared with the vibration playing time point to obtain an error therebetween.

When the timer ends timing, the media playing time point should correspond to the vibration playing time point. However, since there may exist a timing error $\Delta T_1$ in a timing process of the timer, when timing of the timer and media playing are synchronously executed, even though timing for the duration the same as the time difference is theoretically executed, an actual media playing duration and the timing duration of the timer may not be inconsistent when timing is ended. That is, a media playing ending time point may not correspond to the vibration playing time point. Therefore, in the embodiment, when the timer ends timing, it is also necessary to compare the actual present media playing time point with the vibration playing time point to obtain the time error therebetween and the error represents the error $\Delta T_1$ of the timer.

Specifically, when the timer ends timing, the actual playing time point $T_{c2}$ of the media is acquired from a media file and a time difference $\Delta T_1=|(T_{v1}-T_{c2})|$ between the actual present media playing time point $T_{c2}$ and the vibration playing time point $T_{v1}$ is further calculated.

Step S104: If the error is less than a preset threshold, a vibration is played and S101 is entered, and if the error is greater than the preset threshold, skip playing the vibration and S101 is entered.

When the error is tiny (referring to that an effect of the error on synchronous playing of the media and the vibration is almost as little as imperceptible for a user), a phenomenon of serious asynchrony between media playing and vibration playing may be avoided and, in such case, playing of the vibration is allowed. On such a basis, in the embodiment, the preset threshold Te is set and the preset threshold Te is a standard for judging whether the error is tiny enough or not.

Specifically, after the actual present media playing time point $T_{c2}$ is compared with the vibration playing time point $T_{v1}$ to obtain the time difference $|(T_{v1}-T_{c2})|$ in step S103, the preset threshold Te is compared with the error $|(T_{v1}-T_{c2})|$ to judge whether the error $|(T_{v1}-T_{c2})|$ is less than the preset threshold Te or not. If the error is less than the preset threshold Te, it indicates that the vibration is presently allowed, the vibration is played and S101 is re-executed. If the error is greater than the preset threshold, it indicates that the vibration is presently not allowed, playing of the vibration is skipped and S101 is re-executed.

Furthermore, in step S103, when the timer ends timing, the media playing time point may be earlier than the vibration playing time point and may also be later than the vibration playing time point. If the error $|(T_{v1}-T_{c2})|$ between the media playing time point and the vibration playing time point is greater than the preset threshold Te (that is, the vibration is not allowed), two conditions that the media is played too fast or the media is played too slowly may be presented. In step S104, if the error is greater than the preset threshold, playing of the vibration is skipped and S101 is re-executed. Specifically, when the media is played too fast, the present vibration which is not played is skipped and S101 is re-executed to acquire the time difference between the present media playing time point and the next vibration playing time point; and when the media is played too slowly, the present vibration which is not played is reserved and S101 is re-executed to acquire the time difference between the present media playing time point and the playing time point of the present vibration which is not played.

It is to be noted that, in the embodiment, a manner for judging whether the media is played too fast or not is specifically as follows: magnitudes of "$T_{c2}$" and "$T_{v1}$" are compared; when "$T_{c2}$" is greater than "$T_{v1}$", namely $T_{v1}-T_{c2}<0$, it indicates that an actual present media playing progress exceeds a vibration playing progress, that is, the media is played too fast; and on the contrary, when "$T_{c2}$" is less than "$T_{v1}$", namely $T_{v1}-T_{c2}>0$, it indicates that the actual present media playing progress is later than the vibration playing progress, that is, the media is played too slowly.

Specifically, when the error is greater than the preset threshold Te, not only is the vibration skipped, but also whether the media is played too fast or not is further judged ("too fast" is relative to the vibration time point). If the media is actually too fast, it indicates that the vibration playing time falls behind and, in such case, the vibration time has been missed. Therefore, for avoiding occurrence of a vibration delay phenomenon, playing of the present vibration is required to be skipped, the next vibration playing time point such as $T_{v2}$ is acquired at the same time of acquiring the present media playing time point $T_{c2}$ and obtain the time difference $(T_{v2}-T_{c1})$ between the two new time points to re-execute step S101, namely making judgment preparations for the next vibration, and the operations are cyclically executed until all vibrations are executed. On the contrary, when the media is played too slowly, that is, the media playing progress is later than the vibration playing progress, for avoiding the vibration being played too early, it is necessary to acquire and only acquire the present media playing time point $T_{c2}$ and calculate the time difference $(T_{v1}-T_{c2})$ between the present media playing time point and the time point of the present vibration which is not played to re-execute step S101 until first vibration playing control is ended.

In addition, it is to be noted that, in the embodiment, the preset threshold is a fault tolerance threshold value of the difference between a media playing progress and a vibration playing progress. In the embodiment, preferably, the fault tolerance threshold value is $|\pm 20|$ ms, namely the preset threshold is Te=$|\pm 20|$ ms. That is, when the media playing progress is earlier than the vibration playing progress by 20 ms or less than 20 ms or the media playing progress is later than the vibration playing progress by 20 ms or less than 20 ms, the vibration may be played. Furthermore, when an error between the media playing progress and the vibration playing progress is within a range of the fault tolerance threshold value, a difference between media playing and vibration playing is unlikely to be obviously recognized by a user and thus a good user experience may be achieved. Of course, numerical values listed in the embodiment are only preferred examples, the fault tolerance threshold value may also be a value range including another numerical value and elaborations will be omitted herein.

Figure 2:
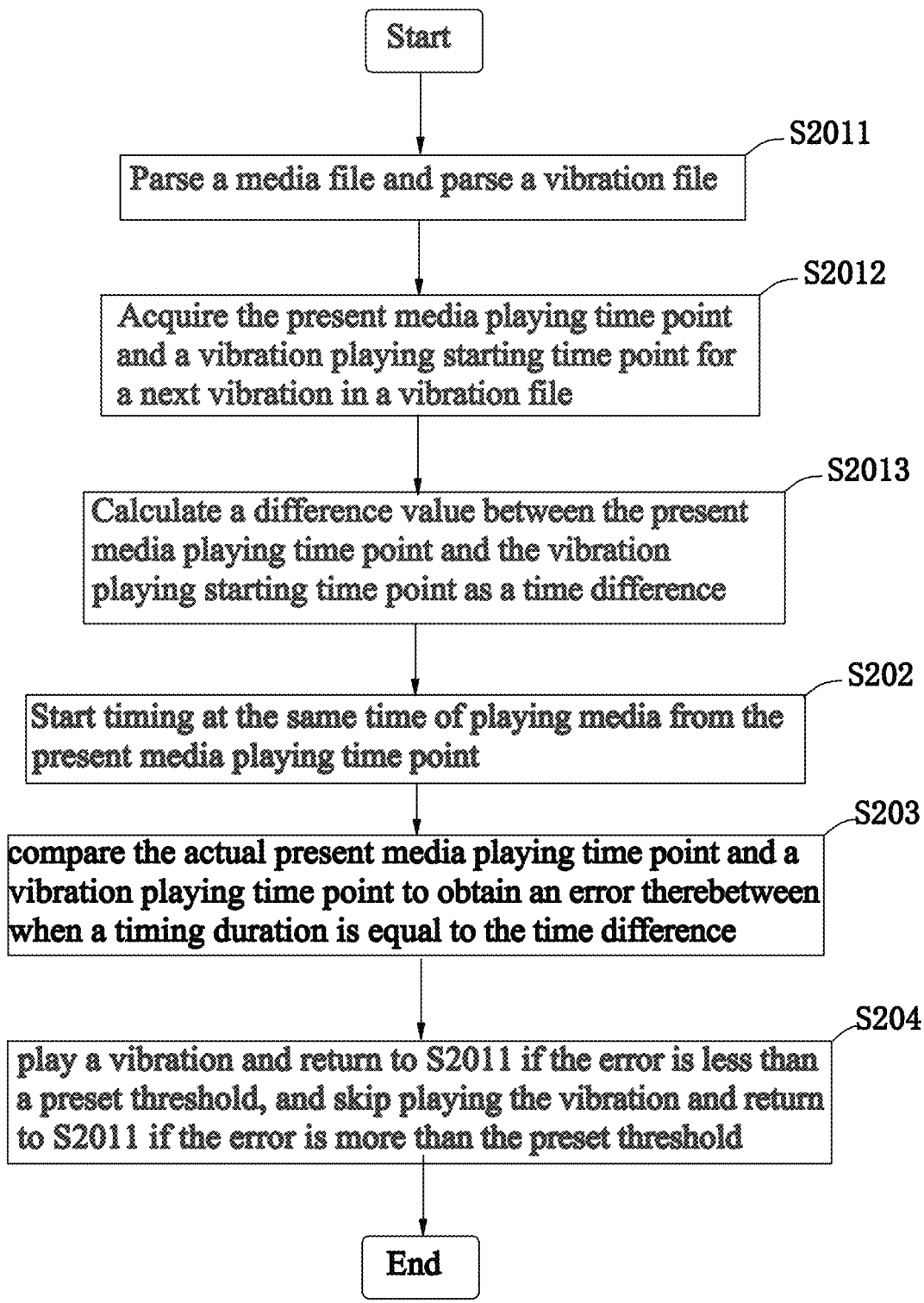
FIG. 2 is a flowchart of a method for synchronously playing media and a vibration according to a second embodiment of the present disclosure.

A second embodiment of the present disclosure relates to a method for synchronously playing media and a vibration. The embodiment is further improved on the basis of the first embodiment. A specific improvement is that step S101 of the first embodiment is further detailed, namely: a media file is parsed and a vibration file is parsed; a present media playing time point and a vibration playing starting time point for a next vibration in the vibration file are acquired; and a difference value between the present media playing time point and the vibration playing starting time point is calculated as a time difference, as shown in FIG. 2.

Each step in the embodiment is illustrated below.

S2011: A media file is parsed and a vibration file is parsed.

It can be understood that the media file and the vibration file include complete media information and vibration information and the media file and the vibration file may be parsed to acquire the present media playing time point and the next vibration playing time point for the subsequent steps.

Herein, the step of a media file is parsed specifically includes: the media file is parsed to acquire a code rate of the media, and time point information of the media is acquired according to the code rate of the media. That is, the playing time point information of the media is specifically acquired through the code rate of the media. When the media file is parsed, it is necessary to acquire the code rate of the media at first for acquisition of the time point information.

In addition, the step of a vibration file is parsed specifically includes: the vibration file is parsed to acquire playing time point information of all vibrations in the vibration file. More specifically, vibration file information includes starting time of the vibrations and ending time of the vibrations and, in addition, includes vibration effect information. The vibration effect information includes intensities of the vibrations and types of the vibrations (for example, vibrations produced by shooting, vibrations produced by explosion, continuous vibrations or short vibrations). The vibration information is acquired for the subsequent control step.

S2012: The present media playing time point and a vibration playing starting time point for a next vibration in the vibration file are acquired.

After the media file and the vibration file are parsed, the present playing time point and the vibration playing starting time point for the next vibration in the vibration file are acquired from the parsed media file and vibration file respectively to prepare data for the subsequent time difference acquisition step.

S2013: A difference value between the present media playing time point and the vibration playing starting time point is calculated as the time difference.

That is, according to the present media playing time point and vibration playing starting time point for the next vibration in the vibration file, which are acquired in step S2012, the difference value therebetween is acquired as the time difference for the subsequent timing step.

S202: Timing starts at the same time of playing the media from the present media playing time point.

S203: When timing duration is equal to the time difference, an actual present media playing time point is compared with the vibration playing time point to obtain an error therebetween.

S204: If the error is less than a preset threshold, a vibration is played and S2011 is entered, and if the error is greater than the preset threshold, skip playing the vibration and S2011 is entered.

Step 202 to Step 204 in the embodiment are substantially the same as Step 102 to Step 104 in the first embodiment. Therefore, the problem that the media and the vibration cannot be synchronously played may be improved well, a good playing effect is achieved and the user experience is effectively improved. Elaborations will be omitted herein.

Figure 3:
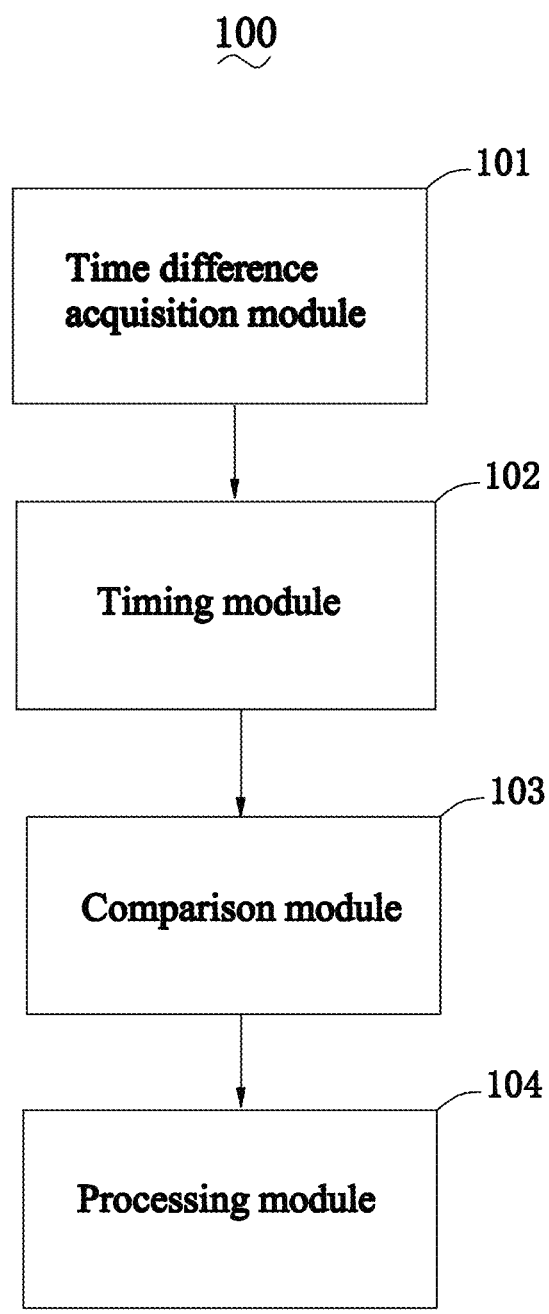
FIG. 3 is a structure schematic diagram of an apparatus for synchronously playing media and a vibration according to a third embodiment of the present disclosure.

A third embodiment of the present disclosure relates to an apparatus 100 for synchronously playing media and a vibration. The embodiment is an apparatus embodiment corresponding to the first embodiment. As shown in FIG. 3, the apparatus includes:

a time difference acquisition module 101, configured to acquire a time difference between a present media playing time point and a next vibration playing time point;

a timing module 102, configured to start timing at the same time of playing the media from the present media playing time point;

a comparison module 103, configured to compare an actual present playing time point of a media file with the vibration playing time point to obtain an error therebetween when timing duration is equal to the time difference; and a processing module 104, configured to play a vibration file and return to the time difference acquisition module if the error is less than a preset threshold, and skip playing the vibration file and return to the time difference acquisition module if the error is greater than the preset threshold.

In the embodiment, the time difference between the present media playing time point and the next vibration playing time point is acquired via the time difference acquisition module 101, the timing module 102 takes the time difference as the timing duration and starts timing at the same time of playing the media, when timing is ended, the comparison module 103 compares the actual present media playing time point with the vibration playing time point to obtain the playing error, and the processing module 104 judges whether a magnitude of the error is within a preset threshold range or not, allows the vibration to be played only when the error is within the range, otherwise forbids play the vibration. In such a manner, it may be ensured that a time difference between vibration and media playing is controlled within the preset threshold range to make asynchrony between vibration and media playing imperceptible for a user. Therefore, the problem that the media and the vibration cannot be synchronously played is effectively improved, a good playing effect is achieved and the user experience is effectively improved. Since multiple details and descriptions in the first embodiment are all applied to the embodiment, elaborations will be omitted herein to avoid repetitions.

Figure 4:
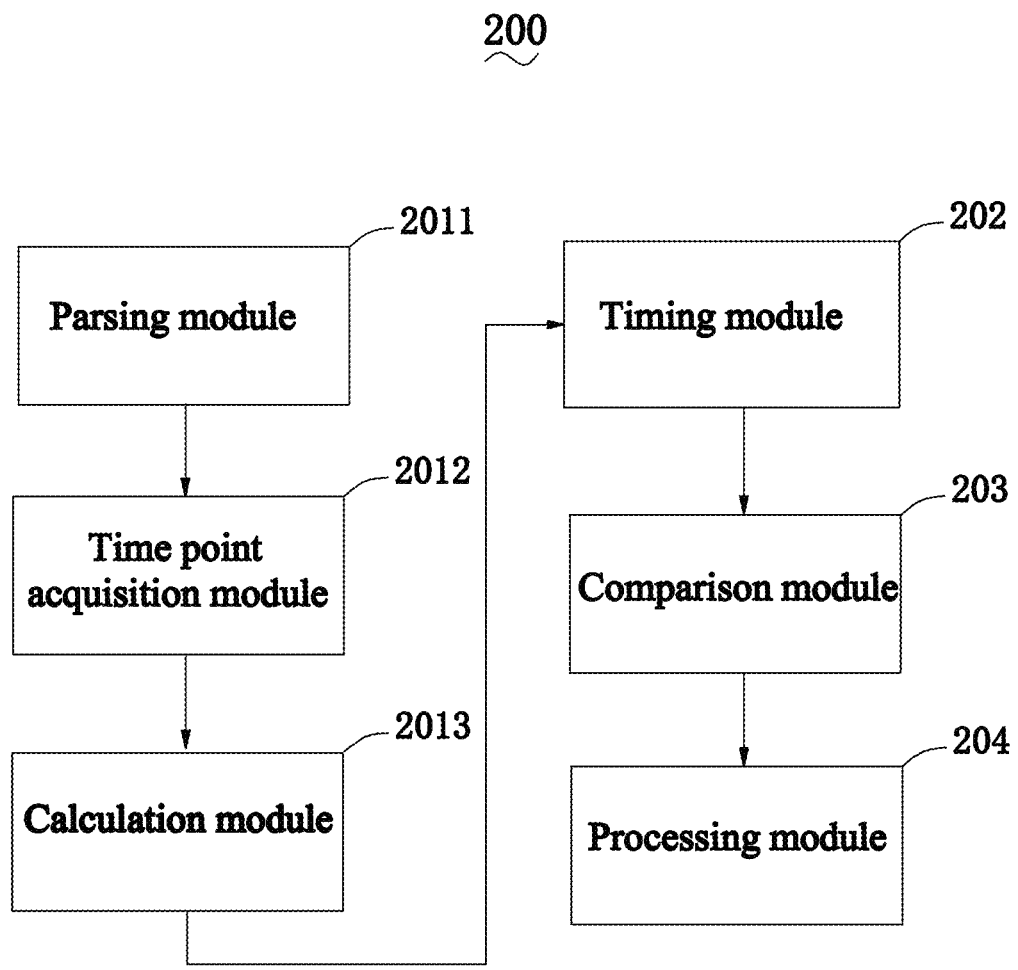
FIG. 4 is a structure schematic diagram of an apparatus for synchronously playing media and a vibration according to a fourth embodiment of the present disclosure.

A fourth embodiment of the present disclosure relates to an apparatus 200 for synchronously playing media and a vibration, which includes: a time difference acquisition module, configured to acquire a time difference between a present media playing time point and a next vibration playing time point; a timing module 202, configured to start timing at the same time of playing the media from the present media playing time point; a comparison module 203, configured to compare an actual present playing time point of a media file with the vibration playing time point to obtain an error therebetween when timing duration is equal to the time difference; and a processing module 204, configured to play a vibration file and return to the time difference acquisition module if the error is less than a preset threshold, and skip playing the vibration file and return to the time difference acquisition module if the error is greater than the preset threshold. According to the apparatus 200 for synchronously playing the media and the vibration, the problem that the media and the vibration cannot be synchronously played may be effectively improved, a good playing effect is achieved and the user experience may be effectively improved. In the embodiment, the time difference acquisition module in the third embodiment is further detailed. As shown in FIG. 4, the time difference acquisition module specifically includes a parsing module 2011, a time point acquisition module 2012 and a calculation module 2013.

A parsing module 2011 is configured to parse the media file and parse the vibration file.

The media file and the vibration file usually include complete media information and vibration information and the media file and the vibration file may be parsed via the parsing module 2011 to acquire the present media playing time point and the next vibration playing time point.

It is to be noted that the parsing module 2011 may further be divided into a media file parsing module and a vibration file parsing module. The media file parsing module is configured to parse the media file to acquire a code rate of the media and acquire time point information of the media according to the code rate of the media. The vibration file parsing module is configured to parse the vibration file to acquire playing time point information of all vibrations in the vibration file.

A time point acquisition module 2012 is configured to acquire the present media playing time point and a vibration playing starting time point for a next vibration in the vibration file.

A calculation module 2013 is configured to calculate a difference value between the present media playing time point and the vibration playing starting time point as the time difference.

Those of ordinary skill in the art can understand that each embodiment is the specific embodiment for implementing the present disclosure. During practical application, various variations may be made thereto in terms of form and detail without departing from the spirit and scope of the present disclosure.

What is claimed is:

1. A method for synchronously playing media and a vibration, comprising:
    S101: acquiring a time difference between a present media playing time point and a next vibration playing time point;
    S102: starting timing at the same time of playing the media from the present media playing time point;
    S103: comparing an actual present media playing time point with the vibration playing time point to obtain an error therebetween when timing duration is equal to the time difference; and
    S104: playing a vibration and returning to S101 if the error is less than a preset threshold, and skipping playing the vibration and returning to S101 if the error is greater than the preset threshold; wherein,
    step S101 further comprises: parsing a media file and parsing a vibration file; acquiring the present media playing time point and a vibration playing starting time point for a next vibration in the vibration file; and
    calculating a difference value between the present media playing time point and the vibration playing starting time point as the time difference; and
    the parsing a media file further comprises: parsing the media file to acquire a code rate of the media; and acquiring time point information of the media according to the code rate of the media.

2. The method for synchronously playing media and a vibration according to claim 1, wherein the parsing a vibration file further comprises: parsing the vibration file to acquire playing time point information of all vibrations in the vibration file.

3. The method for synchronously playing media and a vibration according to claim 1, wherein skipping playing the vibration and returning to S101 if the error is greater than the preset threshold in step S104 further comprises:
    when the media is played too fast, skipping the present vibration which is not played and returning to S101 to acquire the time difference between the present media playing time point and the next vibration playing time point; and
    when the media is played too slowly, reserving the present vibration which is not played and returning to S101 to acquire the time difference between the present media playing time point and the playing time point of the present vibration which is not played.

4. The method for synchronously playing media and a vibration according to claim 1, wherein skipping playing the vibration and returning to S101 if the error is greater than the preset threshold in step S104 further comprises:
    when the media is played too fast, skipping the present vibration which is not played and returning to S101 to acquire the time difference between the present media playing time point and the next vibration playing time point; and
    when the media is played too slowly, reserving the present vibration which is not played and returning to S101 to acquire the time difference between the present media playing time point and the playing time point of the present vibration which is not played.

5. The method for synchronously playing media and a vibration according to claim 1, wherein skipping playing the vibration and returning to S101 if the error is greater than the preset threshold in step S104 further comprises:
    when the media is played too fast, skipping the present vibration which is not played and returning to S101 to acquire the time difference between the present media playing time point and the next vibration playing time point; and
    when the media is played too slowly, reserving the present vibration which is not played and returning to S101 to acquire the time difference between the present media playing time point and the playing time point of the present vibration which is not played.

6. The method for synchronously playing media and a vibration according to claim 2, wherein skipping playing the vibration and returning to S101 if the error is greater than the preset threshold in step S104 further comprises:
    when the media is played too fast, skipping the present vibration which is not played and returning to S101 to acquire the time difference between the present media playing time point and the next vibration playing time point; and
    when the media is played too slowly, reserving the present vibration which is not played and returning to S101 to acquire the time difference between the present media playing time point and the playing time point of the present vibration which is not played.

7. The method for synchronously playing media and a vibration according to claim 3, wherein the preset threshold is a fault tolerance threshold value of the difference between a media progress and a vibration playing progress.

8. The method for synchronously playing media and a vibration according to claim 4, wherein the preset threshold is a fault tolerance threshold value of the difference between a media progress and a vibration playing progress.

9. The method for synchronously playing media and a vibration according to claim 5, wherein the preset threshold is a fault tolerance threshold value of the difference between a media progress and a vibration playing progress.

10. The method for synchronously playing media and a vibration according to claim 6, wherein the preset threshold is a fault tolerance threshold value of the difference between a media progress and a vibration playing progress.

* * * * *